(12) United States Patent
Carpentier et al.

(10) Patent No.: US 9,709,739 B1
(45) Date of Patent: Jul. 18, 2017

(54) INTEGRATED PHOTONIC DEVICE WITH IMPROVED COMPACTNESS

(71) Applicant: STMicroelectronics (Crolles 2) SAS, Crolles (FR)

(72) Inventors: Jean-Francois Carpentier, Grenoble (FR); Patrick Le Maitre, Biviers (FR); Bertrand Borot, Le Cheylas (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 15/450,150

(22) Filed: Mar. 6, 2017

(30) Foreign Application Priority Data

Aug. 3, 2016 (FR) ..................... 16 57524

(51) Int. Cl.
*G02B 6/12* (2006.01)
*G02B 6/125* (2006.01)
*G02B 6/02* (2006.01)
*G02B 6/30* (2006.01)

(52) U.S. Cl.
CPC ......... *G02B 6/125* (2013.01); *G02B 6/02042* (2013.01); *G02B 6/12004* (2013.01); *G02B 6/30* (2013.01); *G02B 2006/12142* (2013.01); *G02B 2006/12147* (2013.01)

(58) Field of Classification Search
CPC ...... H01L 2924/00; H01L 2924/00014; G02B 6/43; G02B 6/4214; G02B 6/12
See application file for complete search history.

(56) References Cited

U.S. PATENT DOCUMENTS

| | | | | |
|---|---|---|---|---|
| 8,278,741 | B2* | 10/2012 | Morse | ................ G02B 6/12004 257/656 |
| 8,503,847 | B2* | 8/2013 | Kokubun | ........... G02B 6/02042 385/126 |
| 2011/0274438 | A1 | 11/2011 | Fiorentino et al. | |
| 2012/0155806 | A1 | 6/2012 | Doerr et al. | |

OTHER PUBLICATIONS

INPI Search Report and Written Opinion for FR 1657524 dated Mar. 31, 2017 (11 pages).
Matteo Cherchi et al: "Dramatic Size Reduction of Waveguide Bends on a Micron-Scale Silicon Photonic Platform," Optics Express, vol. 21, No. 15, Jul. 18, 2013, 10 pages.
Brimont Antoine et al: "Low-Loss and Compact Silicon Rib Waveguide Bends," IEEE Photonics Technology Letters vol. 23 No. 3, Feb. 1, 2015, pp. 299-302.

(Continued)

*Primary Examiner* — Jennifer Doan
(74) *Attorney, Agent, or Firm* — Gardere Wynne Sewell LLP

(57) ABSTRACT

A coupling module includes optical couplers that are coupled to waveguides. The optical couplers are configured to couple to cores of a multi-core optical fiber. The waveguides each include an external part extending from the module and an internal part extending into the module for connecting the external part to the associated optical coupler. The external part of some of the waveguides extends in a preferential direction, while the external part of others of the waveguides extends in a direction opposite to the preferential direction. The internal parts may include a curved portion configured for forming a turn-back.

15 Claims, 2 Drawing Sheets

(56) References Cited

OTHER PUBLICATIONS

Bogaerts W et al: "Compact Single-Mode Silicon Hybrid Rib/Strip Waveguide With Adiabatic Bend," IEEE Photonics Journal, vol. 3 No. 3, Jun. 1, 2011, pp. 422-432.

Alonso-Ramos C et al: "Single-Etch Grating Coupler for Micrometric Silicon Rib Waveguides," Optics Letters, Optical Society of America, vol. 36 No. 14, Jul. 15, 2011 pp. 2647-2649.

* cited by examiner

ABLE

INTEGRATED PHOTONIC DEVICE WITH IMPROVED COMPACTNESS

PRIORITY CLAIM

This application claims priority to French Application for Patent No. 1657524 filed Aug. 3, 2016, the disclosure of which is incorporated by reference.

TECHNICAL FIELD

Embodiments of the invention relate to photonic integrated circuits and in particular to photonic integrated circuits comprising coupling means allowing for example optical signal exchanges with input/output devices such as for example, but not in a limiting way, optical fibers.

BACKGROUND

Conventionally, in order to couple an optical fiber to a photonic integrated circuit, an array of optical fibers (well known as a "fiber array" by those skilled in the art) comprising a plurality of single-core fibers aligned along an axis is used. This fiber array is conventionally secured on the upper face of the photonic circuit in such a way that each fiber of the device is opposite an optical array coupler formed in the photonic circuit. The device is inclined by a few degrees with respect to the normal to the upper surface of the photonic circuit in order to improve the coupling. Optical array couplers comprise at least one diffracting periodic array formed by an alternation of two thicknesses of semiconductor film, wherein one film is partially etched.

Thus, the light rays coming from the optical fibers arrive onto the photonic device in a preferential direction, which means that the waveguides coupled to the optical couplers extend in that direction.

Optical couplers are therefore conventionally produced on the edges of the circuit, the waveguides extending towards the inside of the circuit.

In order to increase the data rate of data that can be transmitted in an optical fiber, it is possible to use multi-core optical fibers. However, the coupling of such a fiber to a photonic integrated circuit by means of array couplers is difficult because each of the couplers have to be disposed opposite one of the cores of the fiber and therefore very close to each other. Each coupler comprises at its output one or two waveguides formed in a semiconductor film of the photonic circuit and whose routing complies with constraints, notably with regard to radius of curvature. In fact, these waveguides, whether they are strip waveguides or rib waveguides, are formed from two thicknesses of semiconductor film used for forming the array structure of the array couplers, these thicknesses being optimized for the performance of the couplers but which impose constraints regarding the minimum radius of curvature to be complied with.

Unless the photonic circuit comprises several layers of semiconductor film, which is complex and costly to produce, the routing of the light signals is carried out in a single plane and the waveguides generally cannot intersect, which gives rise to strict topological constraints. In the case of an assembly of array couplers intended for coupling the circuit to a multi-core fiber, the disposition of the waveguides at the input/output of the couplers therefore imposes constraints on the arrangement of the optical signal transmitting and receiving circuits.

An arrangement that is as symmetrical as possible is generally sought for the microwave electronic devices coupled to the optoelectronic transmitting and receiving circuits disposed at the ends of the waveguides coupled to the optical fibers, which is not always possible when a multi-core fiber is used.

There is therefore a need to be able to couple the optical fiber to different places in the photonic circuit, irrespective of the preferential direction, notably in order to increase flexibility and compactness in the design of the circuits.

SUMMARY

Thus, according to one embodiment, a particularly compact photonic integrated circuit is proposed, comprising optical couplers whose location does not depend on the preferential direction.

According to one aspect, a photonic integrated device is proposed comprising at least one coupling module configured for receiving and/or transmitting optical signals from and/or to an input-output device, disposed in such a way as to deliver and/or receive optical signals in a preferential direction, and waveguides coupled to the at least one coupling module.

According to a general feature of this aspect, the at least one module comprises optical couplers situated on the same level of a semiconductor film and aligned along several axes and each one coupled to a waveguide, the input-output device comprising a multi-core optical fiber and each core of the multi-core optical fiber is coupled to a coupler of the at least one module, each waveguide comprising an external part extending from the module and an internal part extending into the module and connecting the external part to the associated coupler, the external part of at least one of the waveguides extending in the preferential direction and the external part of at least one other waveguide extending in a direction opposite to the preferential direction, its internal part having a curved portion configured for forming a turn-back.

"Turn-back" refers to a turn of one hundred and eighty degrees to within a tolerance which depends on the manufacturing constraints of the device.

Thus, with the combination of a multi-core optical fiber, an arrangement of couplers on the same level and according to several axes and waveguides, some of which comprise curved turning sections, it is possible to obtain a compact coupling module making it possible to redirect light in several directions and which can therefore advantageously be placed at different locations in the photonic circuit.

The device can moreover comprise an intermediate part which is not straight between the curved portion and the external part of the at least one other waveguide.

This intermediate part could be straight, but it is not generally so in practice because of the geometric constraints of the device.

According to one embodiment, the curved portion is U-shaped.

According to one embodiment, the waveguides comprise a first parallelepipedic part situated under a second parallelepipedic part of width less than or equal to that of the first parallelepipedic part, the U-shaped portion of the internal part of the at least one other waveguide has a radius of curvature less than or equal to five micrometers, and the first parallelepipedic part of the internal part of the at least one other waveguide has a height different from the height of the first parallelepipedic part of the external part of the at least one other waveguide.

The use of this type of waveguide makes it possible to minimize the optical losses and to do so despite the very small radius of curvature.

The thicknesses of the first parallelepipedic parts and of the second parallelepipedic parts of the internal parts of the waveguides correspond to the thicknesses of the semiconductor layers used for producing the couplers.

The external part of at least one of the waveguides can extend in a direction different from the preferential direction and from the direction opposite to the preferential direction.

It is also possible to transmit and/or to receive light in several different directions irrespective of the location of the module in the integrated photonic device.

According to one embodiment, the optical couplers coupled to a waveguide whose external part extends in the preferential direction are aligned along a first axis, and the optical couplers coupled to a waveguide whose external part extends in the direction opposite to the preferential direction are aligned along a second axis.

This notably makes it possible to avoid an intersection of the waveguides whilst using a single level of waveguides.

The waveguides can be coupled to optical modulators and the module is advantageously situated at least between two optical modulators.

The device can also comprise a plurality of modules each coupled to a separate input/output device.

BRIEF DESCRIPTION OF THE DRAWINGS

Other advantages and features of the invention will become apparent on examination of the detailed description of embodiments, which are in no way limiting, and of the appended drawings in which.

DETAILED DESCRIPTION

Figure 1:
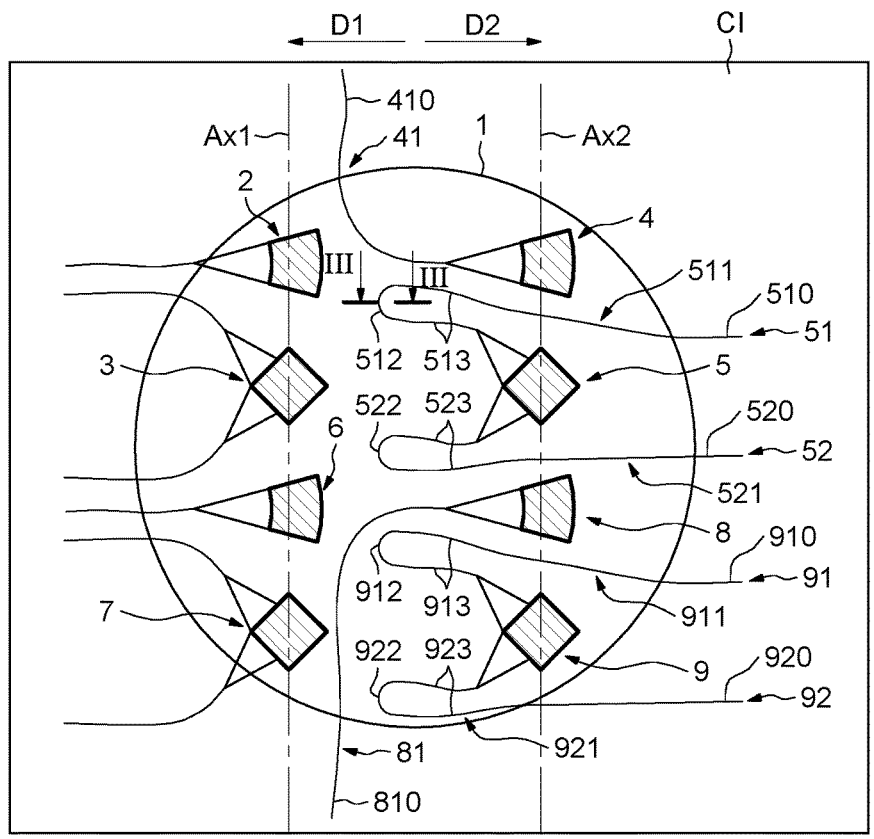
FIG. 1 shows a coupling module.

FIG. 1 shows a coupling module 1. This module can conventionally be produced within a photonic integrated circuit CI, produced, for example, in and on a substrate of the silicon on insulator type, represented partially here for purposes of simplification.

The module 1 comprises a plurality of optical couplers. For example, in this case the module 1 comprises four couplers of the single polarization type 2, 4, 6, 8, that is to say in this case couplers configured for receiving an optical signal and transmitting one of its components ("transverse magnetic" or "transverse electric" according to the terms well known to those skilled in the art) to a single waveguide in a first polarization mode, for example in the transverse electric mode.

The module also comprises four couplers of the polarization separation type 3, 5, 7, 9, that is to say couplers configured for receiving an optical signal and transmitting its transverse electric component to a first waveguide and its transverse magnetic component to a second waveguide while converting it into a transverse electric signal.

Figure 2:
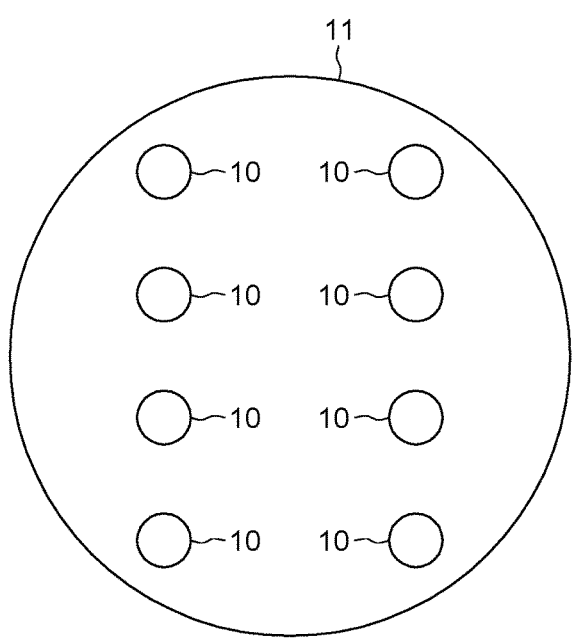
FIG. 2 shows a cross-sectional view of a multi-core optical fiber.

The optical couplers 2 to 9 are disposed on a same level in such a way that each one is opposite a core 10 of a multi-core optical fiber 11 outside of the integrated circuit, a cross-sectional view of which is shown in FIG. 2. The optical fiber 11 can conventionally be secured to the upper face of the circuit CI by adhesion, for example using a resin.

Thus, the optical couplers 2 to 9 are capable of receiving signals from certain cores of the multi-core optical fiber 11.

It is appropriate to note here that the disposition of the couplers and of the fiber cores is not limited to the example shown here, any configuration being conceivable.

The optical fiber 11 is conventionally placed above the module in an inclined manner, in order to form an angle of a few degrees with the normal to the surface of the integrated circuit comprising the module 1, thus defining a preferential direction D1 in which the fiber 11 transmits optical signals. The optical couplers are therefore produced in such a way as to transmit signals in this preferential direction D1.

The optical couplers are each connected to one or two waveguides making it possible to direct the optical signals coming from the optical fiber 11 to external of the module.

Four optical fibers 2, 3, 6, 7 are aligned with each other along a first axis Ax1 and coupled to waveguides of which a part outside of the module 1 extends from the module 1 in the preferential direction D1.

Four other optical couplers 4, 5, 8, 9 are aligned with each other along a second axis Ax2, in this case parallel with the first axis Ax1, and coupled to waveguides of which a part outside of the module 1 extends from the module 1 in a direction different from the preferential direction D1.

In particular, two optical couplers 5 and 9 of the polarization separation type, aligned along the second axis Ax2, are each coupled to two waveguides 51, 52, 91, 92, each comprising a part 510, 520, 910, 920 outside of the module and a part 511, 521, 911, 921 inside of the module.

The parts 510, 520, 910, 920 outside of the module extend from the module 1 in a direction D2 opposite to the preferential direction D1. In order to do this, the parts 511, 521, 911, 921 inside the module of the waveguides 51, 52, 91, 92 each comprise a U-shaped curved portion, configured for producing a turn-back, and an intermediate portion 513, 523, 913, 923 which is not straight forming the connection between the U-shaped portions 512, 522, 912, 922 and the couplers and between the U-shaped portions and the external parts 510, 520, 910, 920 of the waveguide.

The intermediate portion could be straight, but it is not so in this case because of the geometric constraints of the device.

The U-shaped portions 512, 522, 912, 922 in this case have a radius of curvature of the order of 5 micrometers so as to direct the waveguide outside of the module in the direction D2 opposite to the preferential direction D1 without intersecting the other waveguides which extend from the other optical couplers.

The other two optical couplers 4 and 8 aligned along the axis Ax2 are coupled to waveguides 41 and 81 of which the parts 410 and 810 outside of the module 1 extend from the module in directions different from the preferential direction D1 and from its opposite direction D2.

Figure 3:
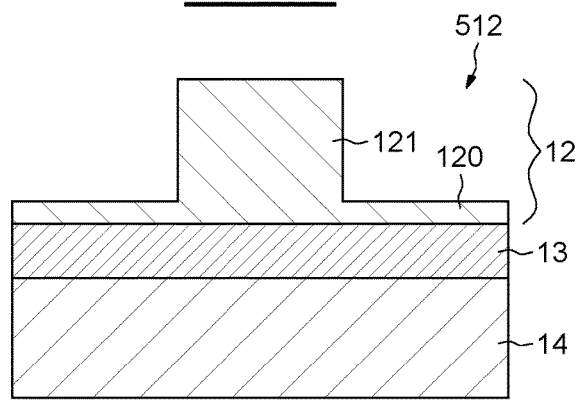
FIG. 3 shows a cross-sectional view of a U-shaped portion of the waveguide.

FIG. 3 shows a cross-sectional view of the U-shaped portion 512 of the waveguide 51 through the axis in FIG. 1. As the waveguides are produced in a similar manner, this U-shaped part 512 is in this case identical to the U-shaped parts of the other waveguides 52, 91, 92.

The waveguide is conventionally produced in a silicon film 12 situated above a buried insulator layer 13 (a buried oxide "BOX" as well known to those skilled in the art) which is itself situated above a silicon supporting layer 14.

The inventors have observed that in order to limit losses in the U-shaped portion 512 of the waveguide 51, and also in the intermediate part 513, which is not straight, it is advantageous for the internal part 511 to have a strip waveguide structure or, as is the case here, rib waveguides having a structure close to that of a strip waveguide, that is to say a slab of low height.

Thus, in the U-shaped portion 512 of the waveguide 51 the first part 120, or slab, is of low height, fifty nanometers in this case for example, and surmounted with the second part 121 which is narrower but is of greater height, for example 300 nanometers in this case.

The structure of the intermediate parts 513 of the internal part 511 of the waveguide 51 is in this case the same as the structure of the U-shaped part.

The height of the first part 120 and the height of the second part 121 are equal to the thicknesses of the semiconductor layers used for producing the couplers. This is particularly advantageous for the method of producing the device.

In the external part 510 of the waveguide 51, which is straight and also of the rib type, the first part 120 has a more conventional height, for example in this case a height of one hundred and sixty three nanometers, and the second part 121 has the same height as in the internal portion 511, that is to say three hundred nanometers.

The internal part 511 and the external part 510 of each waveguide are conventionally coupled by the intermediary of a transition region (not shown) making it possible to join the two parts 510 and 511 having different thicknesses while limiting the optical losses.

Thus, although it is possible to have an internal part 511 in strip form, that is to say an internal part 511 of which the first part 120 and the second part 121 have the same width, the choice of a rib waveguide such as the one described previously allows a less sudden transition between the internal curved part 511 and the external straight part 510 of the waveguide 51, which contributes to reducing the losses due to the coupling between the two parts of the waveguide.

The module 1 therefore makes it possible to redirect the signals coming from the optical fiber 11 in all directions around the module, and to do so irrespective of the preferential direction D1.

Figure 4:
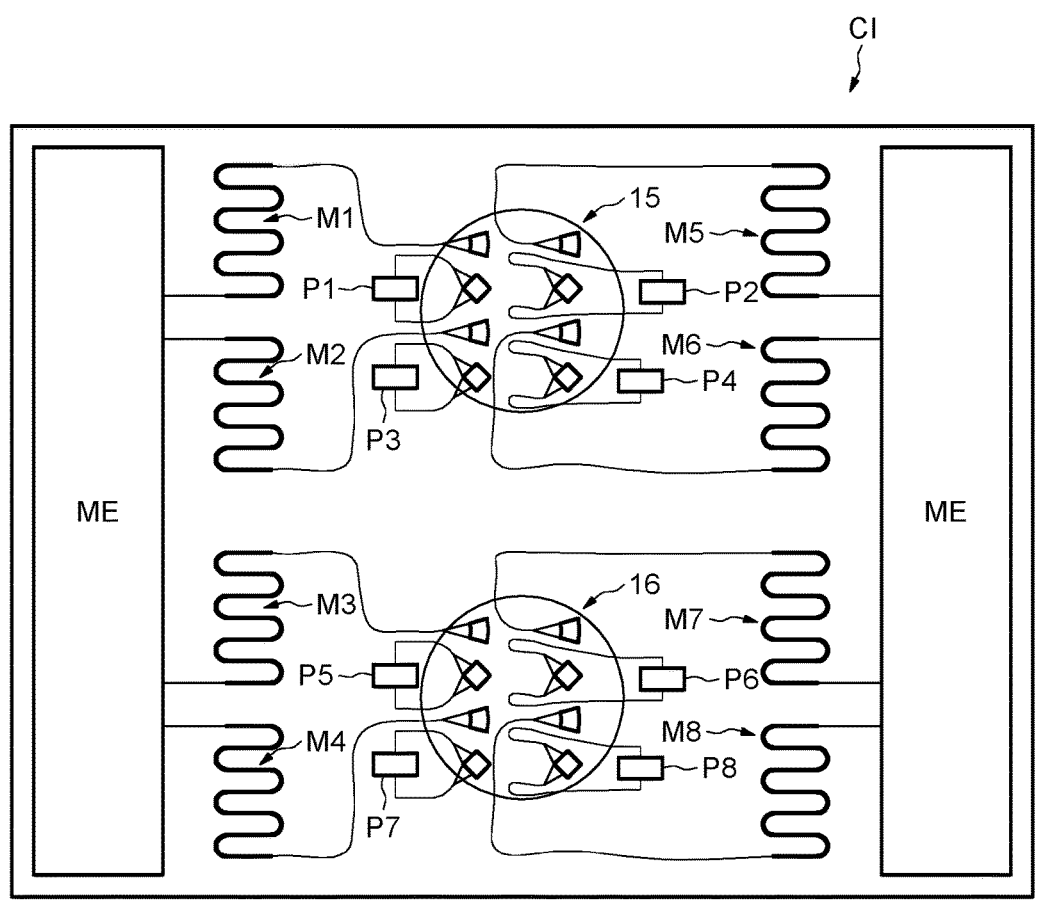
FIG. 4 shows two coupling modules produced within a photonic integrated circuit.

FIG. 4 shows an embodiment in which two coupling modules 15 and 16 are advantageously produced within a photonic integrated circuit CI.

The photonic integrated circuit CI comprises micro-cases ME comprising lasers coupled to several modulators M1 to M8 configured for modulating an optical signal and transmitting it to two modules 15 and 16 such as the one described above and shown in FIG. 1.

The integrated circuit CI comprises moreover photodiodes P1 to P8 coupled to the modules 15 and 16 and capable of converting the light signals coming from the module into electric signals.

Thus, the use of coupling modules such as those described above advantageously makes it possible not to have to position the coupling modules on the edges of the integrated circuit, and therefore to increase flexibility in the design of the circuits.

It is appropriate to note that the arrangement described here by way of example is in no way limiting and that any other configuration incorporating coupling modules similar to the one described above and shown in FIGS. 1 to 3 can be envisaged.

Similarly, although coupling modules comprising eight optical couplers aligned along two axes Ax1 and Ax2 have been described here, it is possible to envisage coupling modules comprising a different number of optical couplers disposed along two or more axes.

The invention claimed is:

1. A photonic integrated device, comprising:
   a coupling module configured to receive and transmit optical signals from and to an input-output device and disposed to deliver and receive optical signals in a preferential direction, and
   waveguides coupled to the coupling module,
   said coupling module comprising a plurality of optical couplers situated on a same level of a semiconductor film and aligned along at least two axes, wherein each optical coupler is coupled to one of said waveguides,
   said input-output device comprising a multi-core optical fiber wherein each core is coupled to an optical coupler of the coupling module,
   each waveguide comprising an external part extending from the coupling module and an internal part extending into the coupling module and connecting the external part to an associated optical coupler,
   wherein the external part of at least one waveguide extends in the preferential direction and wherein the external part of at least one other waveguide extends in a direction opposite to the preferential direction,
   the internal part of said at least one other waveguide having a curved portion configured to form a turn-back.

2. The device according to claim 1, wherein said at least one other waveguide further comprises an intermediate portion positioned between the curved portion and the external part, said intermediate portion of the at least one other waveguide being not straight.

3. The device according to claim 1, wherein the curved portion of said at least one other waveguide is U-shaped.

4. The device according to claim 1, wherein said waveguides comprise:
   a first parallelepipedic part situated under a second parallelepipedic part of width less than or equal to that of the first parallelepipedic part, and
   wherein the curved portion of the internal part of the at least one other waveguide has a radius of curvature less than or equal to five micrometers, and
   wherein the first parallelepipedic part of the internal part of the at least one other waveguide has a height different from a height of the first parallelepipedic part of the external part of the at least one other waveguide.

5. The device according to claim 4, wherein thicknesses of the first parallelepipedic part and of the second parallelepipedic part of the internal parts of the waveguides are equal to thicknesses of first and second semiconductor layers used for the optical couplers.

6. The device according to claim 1, wherein the external part of at least one of the waveguides extends in a direction different from the preferential direction and different from the direction opposite to the preferential direction.

7. The device according to claim 1,
   wherein the optical couplers coupled to a waveguide whose external part extends in the preferential direction are aligned along a first axis, and
   wherein the optical couplers coupled to a waveguide whose external part extends in the direction opposite to the preferential direction are aligned along a second axis.

8. The device according to claim 1,
   wherein the waveguides are coupled to optical modulators and
   wherein the optical module is situated at least between two optical modulators.

9. The device according to claim 1, wherein said optical module comprises a plurality of modules, wherein each optical module is coupled to a separate input-output device.

10. A photonic integrated device, comprising:
a coupling module including:
   a plurality of optical couplers configured to be coupled to a core of a multi-core optical fiber and configured to receive optical signals in a preferential direction; and
   a plurality of waveguides, wherein each waveguide is coupled to a corresponding optical coupler;
wherein said plurality of waveguides includes:
   a first waveguide of said plurality of waveguides including an internal part coupled to a first optical coupler of said plurality of optical couplers and an external part extending in said preferential direction; and
   a second waveguide of said plurality of waveguides including an internal part coupled to a second optical coupler of said plurality of optical couplers and an external part extending opposite said preferential direction;
wherein the internal part of said second waveguide further includes a curved portion configured to form a turn-back from said preferential direction to opposite said preferential direction.

11. The device according to claim 10, wherein the internal part of the second waveguide extends in said preferential direction.

12. The device according to claim 10, wherein said second waveguide further comprises an intermediate portion positioned between the curved portion and the external part, said intermediate portion of the second waveguide being not straight.

13. The device according to claim 10, wherein the curved portion is U-shaped.

14. The device according to claim 10, wherein said plurality of waveguides further includes a third waveguide of said plurality of waveguides including an internal part coupled to a third optical coupler of said plurality of optical couplers and an external part extending perpendicular to said preferential direction.

15. A photonic integrated device, comprising:
a coupling module including a plurality of optical couplers configured to be coupled to a core of a multi-core optical fiber and configured to receive optical signals in a preferential direction, said plurality of optical couplers including first couplers and second couplers; and
a plurality of waveguides, said plurality of waveguides including:
   first waveguides coupled to corresponding ones of the first couplers, each first waveguide including an internal part coupled to one of the first couplers and an external part extending in said preferential direction; and
   second waveguides coupled to corresponding ones of the second couplers, each second waveguide including an internal part extending in said preferential direction and coupled to one of the second couplers, an external part extending either opposite or perpendicular to said preferential direction and a curved portion between the internal part and external part and configured to form a turn from the preferential direction to either opposite or perpendicular to said preferential direction.

* * * * *